United States Patent [19]

Baker et al.

[11] 4,208,063
[45] Jun. 17, 1980

[54] TRAILER STEERABLE WHEN IN REVERSE

[75] Inventors: Edward S. Baker, Broken Arrow, Okla.; Gilbert L. Barnett, Dale, Ind.

[73] Assignee: Gil-Bar Trailer Corporation, Tulsa, Okla.

[21] Appl. No.: 904,619

[22] Filed: May 10, 1978

[51] Int. Cl.² ............................................. B62D 13/06
[52] U.S. Cl. ................................ 280/445; 280/81 A; 280/DIG. 14
[58] Field of Search ........... 280/443, 445, 103, 456 R, 280/460 R, 476, 81 A, DIG. 9, DIG. 14, 426

[56] References Cited

U.S. PATENT DOCUMENTS

| 2,734,754 | 2/1956 | Baker | 280/445 X |
| 3,105,704 | 10/1963 | Schramm | 280/443 |
| 3,753,580 | 8/1973 | Folkert | 280/443 |
| 4,042,255 | 8/1977 | Drewek | 280/445 |

FOREIGN PATENT DOCUMENTS 74621  8/1952  Denmark .................... 280/81 A

Primary Examiner—John A. Pekar
Attorney, Agent, or Firm—Clarence A. O'Brien; Harvey B. Jacobson

[57] ABSTRACT

A mechanism is disclosed for steering in the reverse direction a towed or pulled wheeled vehicle, such as a trailer with one or more axles, each axle having one or more pairs of steerable wheels. A steering rod is connected to at least one of the steerable trailer wheels and extends generally along the trailer axle, terminating at a pivotal connection mechanically movable in relation to a pivotal connection between a fixed support rigid with the trailer axle and a plate rotatable with respect to the trailer axle and angularly positioned by operative association with the vehicle. Movement of the pivotal connection between the steering rod and plate, provided for by suitable mechanical means, imparts a lateral displacement to the steering rod, causing the trailer wheel and by mechanical connection, all trailer wheels, to turn and the trailer to proceed in the same path of movement as the towing vehicle when the vehicle and trailer are moving in a reverse direction.

7 Claims, 5 Drawing Figures

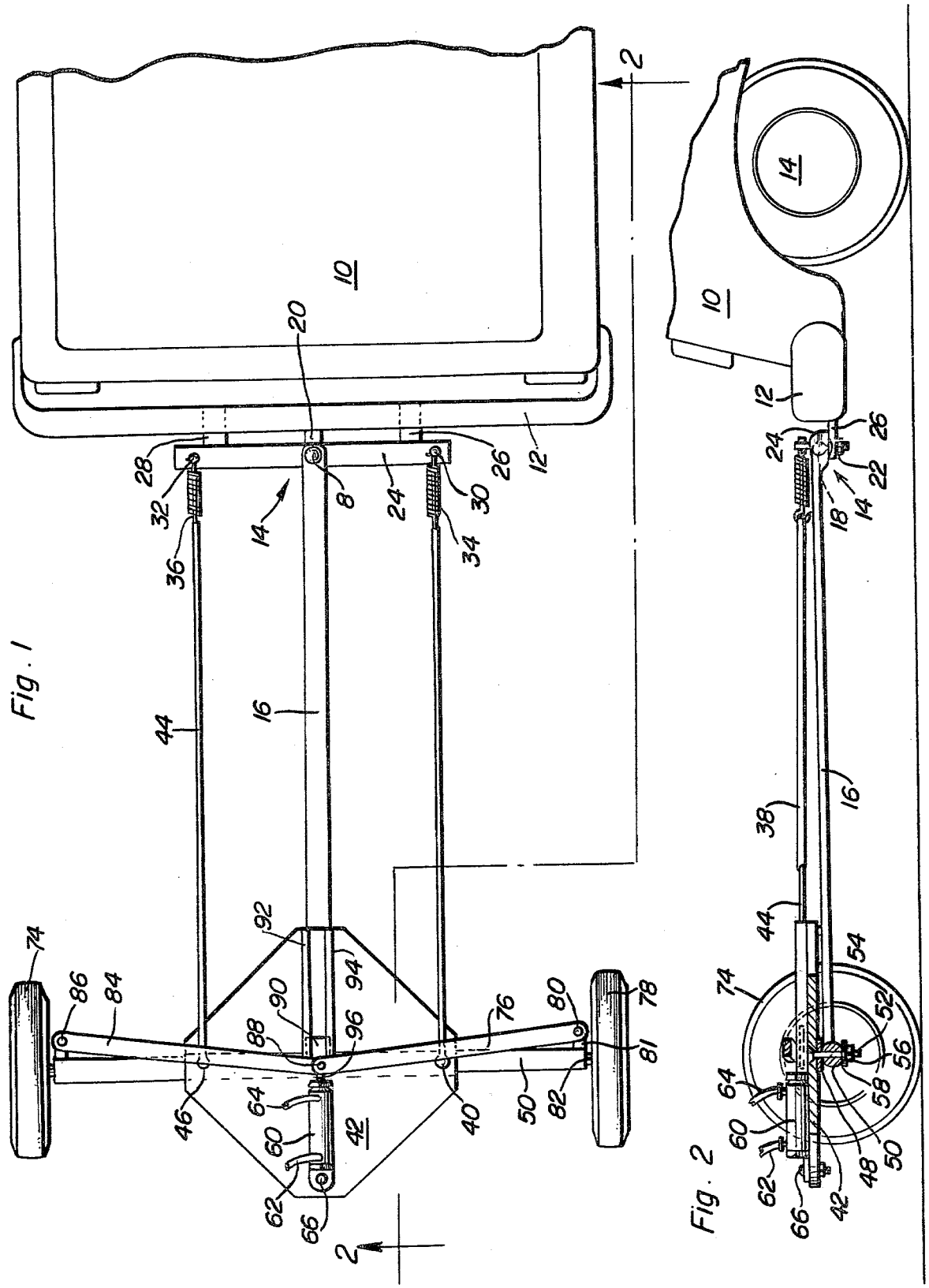

TRAILER STEERABLE WHEN IN REVERSE

BACKGROUND OF THE INVENTION

1. Field of the Invention

The invention relates to a mechanism for steering a towed or pulled wheeled vehicle or trailer in the reverse direction. More particularly, the invention includes a subframe having a plate rotatable about a fixed axis, a movable pivotal connection between the plate and a steering rod which causes the steerable trailer wheels to turn and the trailer to move in the same path of movement as the reverse-operated towing vehicle.

2. Description of the Prior Art

It is known to provide for manual steering of trailer wheels when backing a trailer, and the prior art contains examples of steering structures which are inactive or out of engagement during forward travel and actuated during rearward movement. Also known are fluid actuated power devices related to steerable wheels, as well as trapezoidal or parallelogram type hitch structures.

Examplary of patents describing the state of the prior art are the following:

U.S. Pat. Nos: 1,507,335—Sep. 2, 1924; 2,052,645—Sep. 1, 1936; 2,690,916—Oct. 5, 1954; 2,761,693—Sep. 4, 1956; 2,929,642—Mar. 22, 1960; 3,033,593—May 8, 1962; 3,312,480—Apr. 4, 1967; 3,790,191—Feb. 5, 1974; 3,880,439—Apr. 29, 1975.

SUMMARY OF THE INVENTION

The invention relates to a mechanism for steering in the reverse direction a wheeled vehicle towed or pulled through a vehicle hitch connection with a towing vehicle. More particularly, the towed or pulled vehicle, designated a trailer, having at least one wheeled axle, is provided with a subframe arrangement in which the hinge point for a steering rod is movable in relation to a pivotal connection between a fixed support rigid with the trailer axle and a plate rotatable above the trailer axle and connected with the vehicle hitch. The connection with the vehicle hitch can be either through direct mechanical linkage, causing the plate to rotate as the towing vehicle turns. Alternatively, the plate can be rotated through torque applied directly by use of an electric or other type motor from a point interiorly of the towing vehicle. The present invention can be successfully applied to trailers supported upon a plurality of wheel and axle combinations by provision of a separate plate for each axle, adjacent plates being mechanically connected to operate simultaneously in turning all pairs of wheels to the same degree. When operated with the steering rod or rods in the retracted or neutral position, a turning of the towing vehicle causes no change in the trailer wheels with respect to the trailer axle. Neutral position operation ordinarily is employed during forward movement of the towing vehicle and trailer, while operation with the steering rod or rods in the extended position ordinarily is undertaken during reverse movement.

It is accordingly an object of the present invention to provide reverse steering for a towed or pulled wheeled vehicle or trailer through control of its steerable wheels with respect to its axle during reverse movement.

Another object of the invention is to provide for normal operation of the trailer during forward operation.

Still another object is to provide reverse steering for a trailer having a plurality of wheel and axle combinations.

Yet another feature of the present invention is provision for reverse steering of a trailer by operation from controls within the driving compartment of the towing vehicle.

Still another object of the invention is to provide reverse steering for trailers attached to a towing vehicle through a conventional hitch and tongue assembly, without requiring installation of a special hitch.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a top plan view of the subframe of a towed trailer, along with the connecting tongue and hitch assembly to the rear portion of a towing vehicle.

FIG. 2 is a sectional side elevational view of the wheel assembly and a side elevational view of the hitch assembly of the trailer of FIG. 1, along planes designated 2—2 in FIG. 1.

DESCRIPTION OF THE PREFERRED EMBODIMENTS

Figure 3:
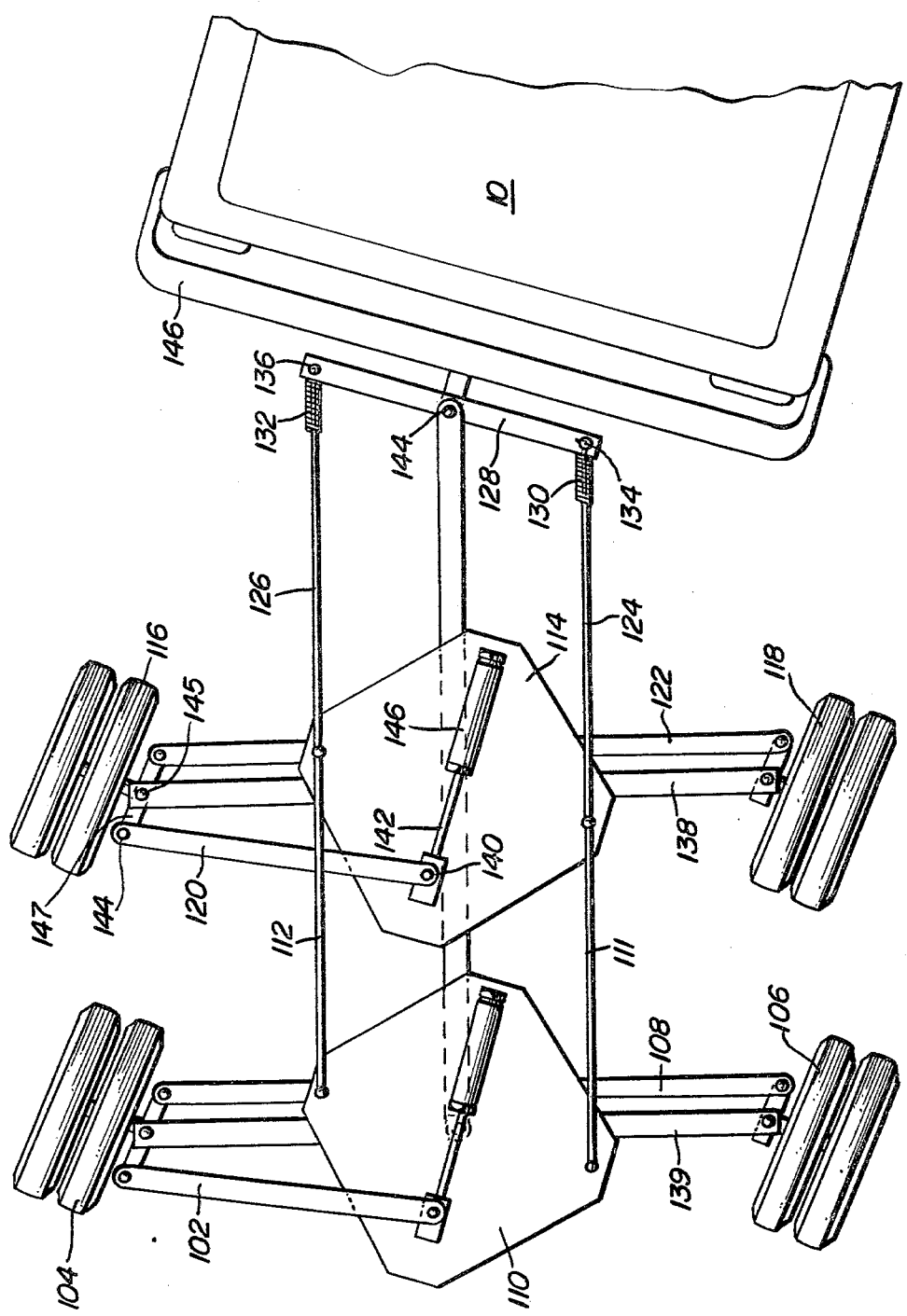
FIG. 3 is a top plan view of a second embodiment of the invention.

Referring now to the drawings, a towing vehicle 10 with exterior body, bumper 12, and rear wheel 13 has attached to the bumper 12 a hitch mechanism, shown generally by numeral 14, for pulling conventional trailer tongue 16 in the forward direction, or for pushing trailer tongue 16 in the rearward direction when operating in reverse. Hitch 14 is of conventional design, illustrated in FIGS. 1, 2, 3 and 4 as a center mounted ball hitch, mounted on bumper 12, the ball 18 allowing free horizontal swinging of tongue 16 as towing vehicle 10 executes a turning maneuver in either the forward or reverse direction. Ball 18 is connected to bumper 12 through bar 20 and is retained thereon by nut 22. Hitch bar 24 having bracing bars 26 and 28 attaching hitch bar 24 to bumper 12 to maintain hitch bar 24 parallel to and immovable with respect to bumper 12, has near its end swivel anchors 30 and 32, each of which anchors the end of a spring, respectively designated 34 and 36. Spring 34 is connected to steel control cable 38, which is attached through plate swivel anchor 40 to plate 42, and spring 36 is connected to steel control cable 44, which is likewise anchored to plate 42 through plate swivel anchor 46. It is understood that steel control cables 38 and 44 can be replaced by suitable equivalent control rods connecting the respective swivel anchors enumerated, without departing from the scope of invention contemplated. Plate 42 is free to rotate with respect to fixed axle support 48, welded to axle 50, with plate 42 rotating about bolt 52, the head 54 of which is countersunk into plate 42, bolt 52 being retained by nut 56 in conjunction with washer 58. Cylinder 60, having cylinder hoses 62 and 64, is anchored to plate 42 by bolt 66, attached to cylinder 60 through cylinder support 68 and held by nut 70 and washer 72. As described hereinafter in connection with discussion of FIG. 3 and cylinder 146 therein, the cylinder of the present invention is preferably hydraulically powered, but equivalent means, such as pneumatic operation, are also contemplated, as within the scope of the invention, which is not limited to hydraulic cylinders. Reference throughout the specification to "hydraulic" cylinders, shafts, or the like, is to be construed as including equivalent means, such as pneumatic cylinders, shafts, or the like. Trailer wheel 74 can be seen in FIG. 2, and greater detail of assembly of the plate 42 and associated components can be seen in FIG. 5. Steering rod 76 connects with trailer wheel 78 through spindle pivot 80 and spindle turning arm 81, located forward of and inside the axial connection 82 between axle 50 and wheel 78. A ball joint or other mechanism (not shown) links the end of tie rod 76, through the spindle pivot 80 and spindle turning arm 81 to right trailer wheel 78. A similar arrangement connects steering rod 84 through spindle pivot 86 to left trailer wheel 74. The steering rods 76 and 84 are connected to a pivot pin 88 mounted on a slide block 90 shown in FIG. 1 in its retracted or neutral position and which is capable of moving longitudinally by sliding within plate assembly guides 92 and 94. When so moved through actuation of hydraulic cylinder 60 resulting in extension of piston rod 96 to move block 90 forwardly, the pivot pin 88 is moved forwardly of pivot bolt 52 and the entire assembly is in position for operation to turn wheels 74 and 78 as towing vehicle 10 turns when moved in the reverse direction. Such operation will be more particularly described in discussion of FIGS. 3 and 5.

Referring now to FIG. 3, a second embodiment of the present invention shows application to a multiple tandem wheeled trailer having two axles and four wheels per axle. Each axle has a turning system, and in the embodiment depicted in FIG. 3, only a single steering rod 102 is employed to turn the left trailer wheel 104. The corresponding right wheel 106 is turned to the same degree as wheel 104 by displacement of tie rod 108. Plate 110, controlling movement of wheels 104 and 106, is mechanically connected by steel control cables 111 and 112 to plate 114, which controls the turning of wheels 116 and 118 through steering rod 120 and tie rod 122. Steel control cables 124 and 126 connect plate 114 with hitch bar 128 through swivel anchors 134 and 136, springs 130 and 132 being respectively interposed therebetween.

To illustrate operation of the invention, reference will be made to FIG. 3 and wheels 116 and 118 connected to axle 138, it being understood that the same operation applies to axle 139 and wheels 104 and 106.

It is to be understood that FIG. 3 illustrates operation in the reverse direction, where trailer wheels are turned. Such operation only occurs when the hinge point, designated by the numeral 140 in FIG. 3, is displaced from its neutral point directly above the axle 138 midpoint, as is the case illustrated in FIG. 3. Were such hinge point 140 so located directly above the axle 138 midpoint, wheels 116 and 118 would remain in the straight ahead position, rather than as seen in FIG. 3. It is to be noted that in FIG. 1, hinge point 88 is so located above the axle 50 midpoint, and that wheels 74 and 78 will remain in the same position as shown in FIG. 1, despite pivotal movement of hitch bar 24 with respect to trailer tongue 16. Returning to FIG. 3, and noting that hinge point 140 has been displaced from its neutral position by extension of piston rod 142, and further noting that rotation of hitch bar 128 about center hitch 143 has occurred, plate 114 has been rotated through pulling of control cable 126. Rotation of plate 114 has caused sideward displacement of the end of steering rod 120 at hinge point 140, forcing the end of steering rod 120 at spindle point 144 to turn wheel 116 and displace tie rod 122 transversely through rotation of spindle arm 147 about axle pivot point 145. Such transverse displacement of tie rod 122 causes wheel 118 to turn to the same degree as wheel 116. Control over the precise angle through which wheels 116 and 118 have been turned is achieved through control of the displacement of piston rod 142, a greater angle of turning resulting from greater displacement of piston rod 142. Such displacement is regulated and controlled by regulation of pressure within cylinder 146 in a conventional manner. Cylinder 146 can be a conventional pneumatic or hydraulic cylinder, having appropriate pumps or compressors (not shown). Preferably, a hydraulic cylinder is provided, but alternative arrangements, including pneumatic means, an electrically operated solenoid or other means for displacing the pivot pin to which the steering rod is connected are possible. It is to be noted that, as towing vehicle 10 operates in the reverse direction, turned wheels 104, 106, 116 and 118 cause the trailer assembly supported by the subframe shown in FIG. 3 to move in the same rearward path of movement as towing vehicle 10. It is readily apparent that, in the absence of such turned wheels, the trailer assembly shown in FIG. 3 would follow a leftward path, increasing further the angle between trailer and towing vehicle center lines as rearward motion proceeds. Such action leads to the undesirable lack of control sometimes known as "jack-knifing". With use of any of the embodiments of the present invention, alignment of trailer and towing vehicle center lines can be maintained indefinitely during backing operations.

Figure 4:
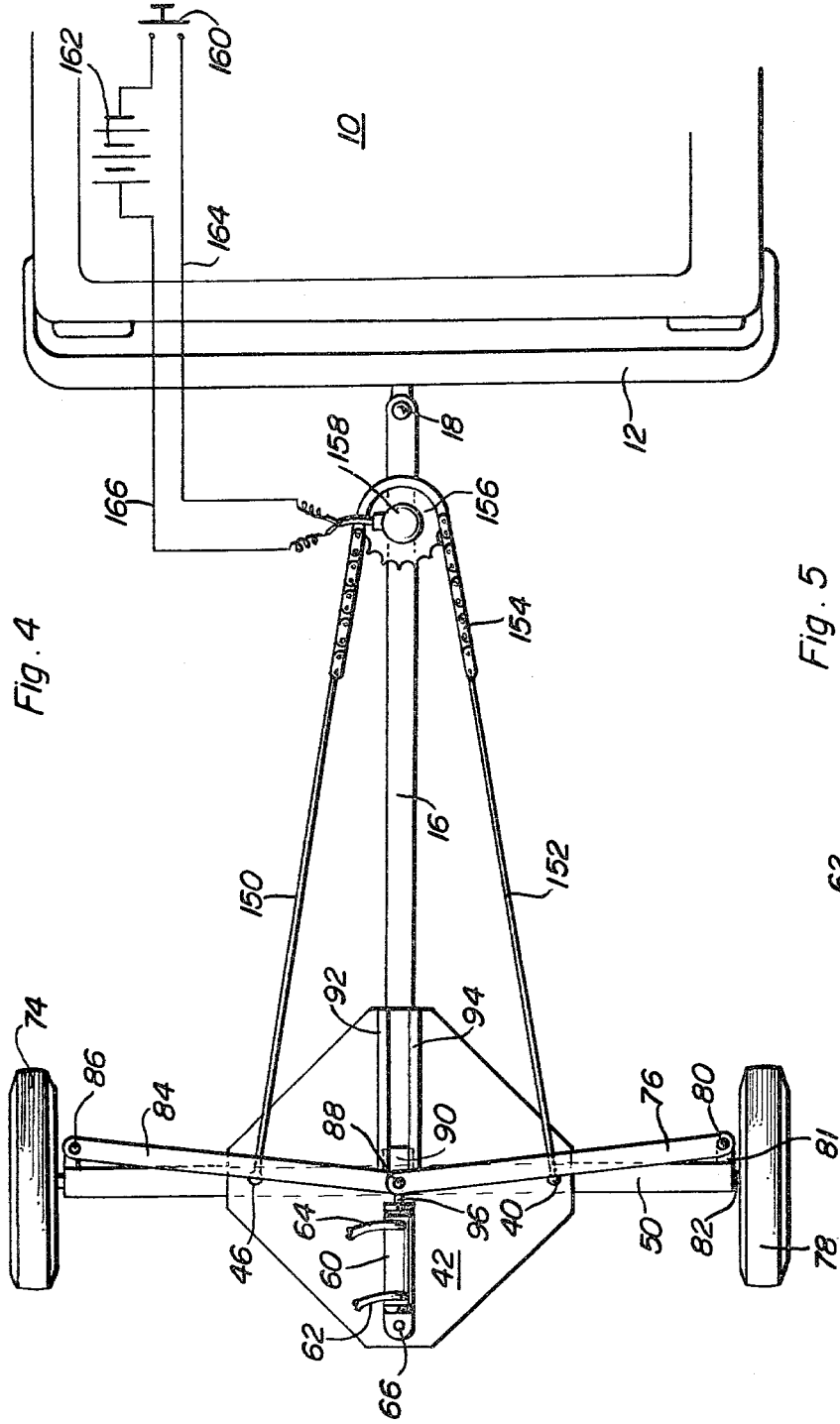
FIG. 4 is a top plan view of a third embodiment of the invention.
Figure 5:
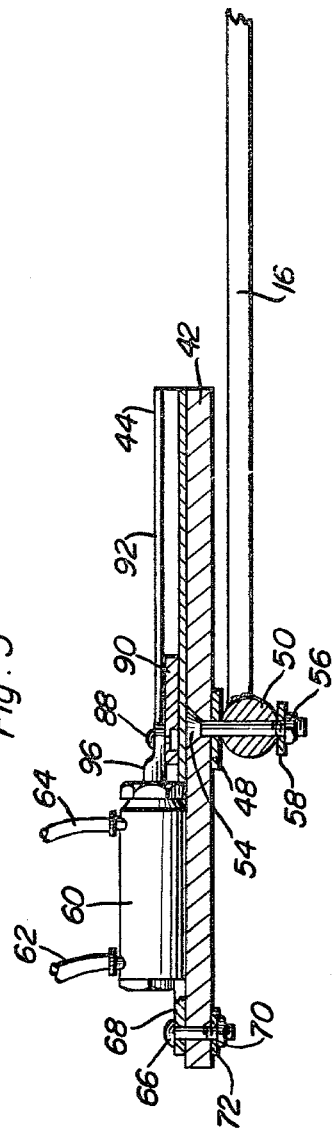
FIG. 5 is an enlarged partial sectional side elevational view of the axially mounted arrangement comprising the rear portion of the invention, showing a section taken along a plane passing through the center line of the first embodiment shown in FIG. 1.

A third embodiment of the present invention is shown in FIG. 4, where no hitch bar is present. Instead, rotation of plate 42 is effected by direct mechanical torque applied through steel control cables 150 and 152 through respective swivel anchors 46 and 40. A sprocket chain 154, attached at each end to control cables 150 and 152, is driven by sprocket gear 156, whose axis is fixedly attached to trailer tongue 16 by means not shown in FIG. 4. A reversible electric motor 158, the rotor of which can be connected to suitable gearing means (not shown) turns sprocket gear 156 when activated by switch 160, closing the electrical circuit from battery 162 through wires 164 and 166 connected to motor 158. Provision for reversing the direction of motion of the rotor of motor 158 is made, but not shown in FIG. 4. Rotation of the rotor of motor 158 so as to produce selected rotation of sprocket 156 accommodates reverse motion as described and outlined above in the discussion of FIG. 3. It is to be understood, however, that the arrangement shown in FIG. 4 is in the neutral position, adapted for forward movement. Only when piston rod 96 is displaced forward, and hinge point 88 moved out of the neutral position directly above the midpoint of axle 50, will such rotation of sprocket 156 cause steering of wheels 74 and 78.

The present invention has utility in many types of trailers, including, for example, boat trailers, camper trailers, mobile home trailers, utility trailers, cargo trailers, equipment trailers, farm trailers, farm equipment, horse trailers, industrial trailers, and industrial equipment. More generally, the invention can be applied to any towed or pulled wheel vehicle, as the above enumeration only exemplifies particular applications of the invention.

A feature of the invention is its simplicity, requiring relatively few components to furnish automatic control governed by a shifting lever in the towing vehicle. Resulting from such simplicity is high reliability, lower levels of maintenance than more complicated systems would require and ruggedness of design, all possible from a system requiring few components.

For certain trailer applications, a hydraulic cylinder is preferred. Typically, hydraulic activation will occur when a circuit is closed placing back-up lights in operation. Closing of such circuit activates a double pole double throw solenoid switch, which energizes an electric motor to activate hydraulically the cylinder piston which extends the hydraulic cylinder shaft to permit operation in the reverse movement mode. Limit switches, activated upon extension of the hydraulic cylinder shaft, prevent the electric motor from running continuously.

Although hydraulic operation is preferred, pneumatic activation is also operable, and has particular utility for boat trailers submerged in water during boat loading or launching. In a pneumatic system, the full stroke of the cylinder piston is utilized, obviating the necessity for limit switches.

It is further to be noted from FIG. 3 that, upon full extension of cylinder shaft 142, the distance between hinge point 140 in its extended and in its retracted position is greater than the distance between steering rod connecting pin 144 and spindle point 145. Consequently, wheel 116 turns through a greater angle than plate 114, resulting eventually in alignment of the trailer directly behind the vehicle as both are carried through rearward movement. Such alignment results whether reverse turning is to the left or to the right.

The present invention is applicable to so-called "gooseneck" trailers if certain dimensional relationships are maintained. Specifically, referring to FIG. 1, for applicability to "gooseneck" trailers, the distance between swivel anchors 40 and 30, swivel anchors 46 and 32, and hinge point 88 and center hitch 18 must be equal, and furthermore, control cables 44 and 38 must be an equal distance from trailer tongue 16.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A trailer supported by a pair of steerable wheels, steering linkage means connected with said steerable wheels for steerably controlling said wheels and actuating means connected with said steering linkage means for actuation thereof, said actuating means including an actuating member, means pivotally supporting said actuating member from the trailer, means pivotally connecting the actuating member with the steering linkage means whereby pivotal movement of the actuating member will cause movement of the steerage linkage means and steerable movement of the wheels when the pivotal connection means between the steering linkage means and actuating member is spaced from the pivotal connection means between the actuating member and trailer, and means selectively adjusting the pivotal connection means between the actuating member and steering linkage means between a non-steerable position in alignment with the pivotal connection means between the actuating member and trailer with pivot axes of the pivotal connecting means coinciding so that the steering linkage means and steerable wheels will not be steerably moved when the actuating member is pivoted in relation to the trailer and a steerable position with the pivotal connection means between the actuating member and steering linkage means being spaced from the pivotal connection means between the actuating member and the trailer for steerably moving the steering linkage means and the steerable wheels when the actuating member is pivoted in relation to the trailer, said actuation means including means pivoting said actuating member in relation to the trailer, said means pivoting the actuating member including a power device supported by said trailer and connected with said actuating member, said power device being controllable by an operator of a towing vehicle articulately connected to the trailer to enable steering control of the steerable wheels independent of the articulate movement between the trailer and towing vehicle.

2. The structure as defined in claim 1 wherein said means selectively adjusting the pivotal connection means between the actuating member and steering linkage means includes a fluid pressure actuated, double acting piston and cylinder assembly interconnecting the actuating member and the pivotal connection means connected with the steering linkage means.

3. The structure as defined in claim 1 wherein said power device includes a reversible motor having a sprocket gear output, a sprocket chain engaged with said sprocket gear, tension members interconnecting the ends of the chain and the actuating member, and control means for the motor located in the towing vehicle.

4. In combination, a towing vehicle, a wheeled towed vehicle articulately connected with the towing vehicle, said towed vehicle including steerable wheels and means controlling the angular position of said steerable wheels on the towed vehicle, said means controlling the steerable wheels including a steering rod operatively connected with at least one of said steerable wheels in offset relation, a control member pivotally supported from said towed vehicle, means slidably and pivotally connecting the steering rod to said control member to enable the pivot axis between the steering rod and control member to move between a first position coincident with the pivot axis of the control member with the steerable wheels in a straight ahead position regardless of the pivotal movement of the control member to a second position spaced therefrom to pivot the steerable wheels when the control member is pivoted, power means shifting said pivot axis between its positions, and means pivoting said control member in relation to the towed vehicle for steering the towed vehicle by steering the steerable wheels, the articulate connection between the vehicles including a centrally disposed forwardly extending tongue on the trailer and a hitch assembly connecting the forward end of the tongue and rear portion of the towing vehicle, said means pivoting said control member including a pair of force transmitting members oriented along opposite sides of the tongue and connected to the control member, said pivot axis between the steering rod and control member being spaced a greater distance from the pivot axis of the control member than the offset distance of the connection between the steering rod and steerable wheel when in its second position whereby the degree of angular movement of the steerable wheel is greater than the degree of angular movement of the control member.

5. The structure as defined in claim 4 wherein said control member is a plate having a central portion pivotally supported from the towed vehicle, said force transmitting members having rearward ends connected to the plate in equal transversely spaced relation to the pivot axis of the plate.

6. The structure as defined in claim 5 together with means connecting the forward ends of the force transmitting members are connected with the towing vehicle in equal transversely spaced relation to the hitch assembly for pivoting the plate in response to relative horizontal pivotal movement between the vehicle.

7. The structure as defined in claim 5 together with a reversible motor mounted on said tongue and drivingly connected with said force transmitting members to pivot the plate and control the steerable wheels independent of relative pivotal movement between the vehicles.

* * * * *